US010967900B2

(12) United States Patent
Pichonnat et al.

(10) Patent No.: US 10,967,900 B2
(45) Date of Patent: Apr. 6, 2021

(54) COMPOUND ENERGY ABSORPTION SYSTEMS FOR STEERING COLUMNS

(71) Applicants: ThyssenKrupp Presta AG, Eschen (LI); thyssenkrupp AG, Essen (DE)

(72) Inventors: Christian Pichonnat, Indianapolis, IN (US); Kevin Templin, Fishers, IN (US); Bryce Welch, Indianapolis, IN (US); Justin Yoho, Whitestown, IN (US)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 41 days.

(21) Appl. No.: 16/446,225

(22) Filed: Jun. 19, 2019

(65) Prior Publication Data

US 2020/0398885 A1  Dec. 24, 2020

(51) Int. Cl.
*B62D 1/19* (2006.01)
*F16F 7/12* (2006.01)

(52) U.S. Cl.
CPC .............. *B62D 1/192* (2013.01); *F16F 7/123* (2013.01); *F16F 7/125* (2013.01)

(58) Field of Classification Search
CPC .......... B62D 1/19; B62D 1/192; B62D 1/195; B62D 1/197; F16F 7/12; F16F 7/125; F16F 7/123; F16F 7/128
USPC ..................... 74/492; 280/777; 188/371, 376
See application file for complete search history.

(56) References Cited

U.S. PATENT DOCUMENTS

| 9,845,104 | B2 | 12/2017 | Hong |
| 9,845,105 | B2 | 12/2017 | Tinnin |
| 10,099,715 | B2 | 4/2018 | Bodtker |
| 10,023,222 | B2 | 7/2018 | Tinnin |
| 2006/0214411 | A1* | 9/2006 | Ikegaya ................. B62D 1/195 280/777 |
| 2011/0115206 | A1 | 5/2011 | Sulser |
| 2013/0068062 | A1 | 3/2013 | Kircher |
| 2016/0121920 | A1 | 5/2016 | Klepp |
| 2016/0368524 | A1 | 12/2016 | Tinnin |

(Continued)

FOREIGN PATENT DOCUMENTS

| DE | 102016214709 A | 2/2018 |
| DE | 102016220531 A | 4/2018 |

(Continued)

*Primary Examiner* — Keith J Frisby
(74) *Attorney, Agent, or Firm* — thyssenkrupp North America, LLC (57) ABSTRACT

A compound energy absorption system for a steering column may include different first and second energy absorption mechanisms. The first energy absorption mechanism may involve a slide that deforms a deformation strip in a crash event. The second energy absorption mechanism may involve an energy absorbing strap and a carrier, with the energy absorbing strap being configured to bend and/or tear in a crash event. The energy absorbing strap, the carrier, the deformation strip, and the slide may be packaged compactly in series along an inner jacket tube of the steering column such that the carrier and the deformation strip move relative to the slide and a portion of the energy absorbing strap in a crash event. A pyrotechnic switch, a solenoid, or the like may selectively couple or decouple the second energy absorption mechanism depending on the severity or anticipated severity of a crash event.

21 Claims, 9 Drawing Sheets

(56) References Cited

U.S. PATENT DOCUMENTS

| | | |
|---|---|---|
| 2018/0050719 A1 | 2/2018 | Agbor |
| 2018/0105196 A1 | 4/2018 | Bodtker |
| 2019/0100243 A1* | 4/2019 | Bodtker .................. B62D 7/22 |
| 2020/0317252 A1 | 10/2020 | Kim |

FOREIGN PATENT DOCUMENTS

| | | |
|---|---|---|
| DE | 102017103753 A | 8/2018 |
| DE | 102017201708 A | 8/2018 |
| DE | 102018204735 A | 10/2018 |
| EP | 2993108 A | 3/2016 |
| WO | 2014048535 A | 4/2014 |
| WO | 2018073304 A | 4/2018 |
| WO | 2018153773 A | 8/2018 |
| WO | 2018154322 A | 8/2018 |
| WO | 2019088613 A | 5/2019 |

* cited by examiner

COMPOUND ENERGY ABSORPTION SYSTEMS FOR STEERING COLUMNS

FIELD OF THE DISCLOSURE

The present disclosure relates generally to steering columns, including energy absorption systems that are configured for use with steering columns and include more than one type of energy absorption mechanism.

BACKGROUND

Energy absorption systems for steering columns have been employed in recent years to soften the impact of steering wheels on drivers in crash events. Energy absorption systems for steering columns are known in the art, such as in U.S. Patent Publication No. 2013/068062A1, which was filed Mar. 16, 2012 and is entitled "Steering Column for a Motor Vehicle"; U.S. Patent Publication No. 2018/050719A1, which was filed Sep. 8, 2017 and is entitled "Steering Column for a Motor Vehicle"; German Patent Publication No. DE102016220531A1, which was published Apr. 19, 2018 and is entitled "Lenksäule mit adaptiver Energieabsorptionsvorrichtung für ein Kraftfahrzeug"; German Patent Publication No. DE102016214709A1, which was published Feb. 15, 2018 and is entitled "Steering Column for a Motor Vehicle"; German Patent Publication No. DE102017201708A1, which was published Aug. 2, 2018 and is entitled "Lenksäule für ein Kraftfahrzeug"; German Patent Publication No. DE102018204735A1, which was published Oct. 11, 2018 and is entitled "Lenksäule für ein Kraftfahrzeug"; WIPO Publication No. WO2018/154322A1, which was filed Feb. 23, 2018 and is entitled "A Steering Column Assembly"; WIPO Publication No. 2018/153773A1, which was filed Feb. 15, 2018 and is entitled "Steering Column Assembly"; U.S. Patent Publication No. 2018/0105196A1, which was filed Oct. 14, 2016 and is entitled "Stationary Energy Absorption Strap Control Assembly for Vehicle Steering Column"; and U.S. Patent Publication No. 2016/0368524A1, which was filed Jun. 13, 2016 and is entitled "Steering Column Assembly Having an Energy Absorption Assembly," all of which are hereby incorporated by reference in their entireties. Some of these energy absorption systems can adapt a resistive force based on conditions associated with the crash event. Such conditions may include vehicle speed, mass of a driver, and/or whether the driver's seatbelt is fastened.

One drawback of at least some known energy absorption systems concerns packaging in tight spaces adjacent to steering columns. In short, many energy absorption systems consume more space than is allotted for by vehicle manufacturers, for instance. In particular, many energy absorption systems protrude relatively-large distances radially from a tube of a steering column, especially laterally with respect to the vehicle. Further, energy absorption systems tend to consume more space when two of the same type of energy absorption mechanisms are placed in series or stacked on top of one another.

Another drawback of at least some known energy absorption systems concerns relatively-involved change-out procedures during pre-production testing. By way of example, many governments require steering column energy absorption systems to meet certain crash test requirements before such systems are approved for use in passenger vehicles. Thus, during development and/or prove-out, a spent energy absorption system may be detached from a steering column and replaced with a new energy absorption system after each successive crash test. When the procedure for changing out the energy absorption system is relatively-involved (e.g., where access to the energy absorption system is obstructed), however, pre-production testing not only takes longer but demands more in the way of manual labor.

Thus a need exists for steering column energy absorption systems that are adaptive, compact, and easily-accessible.

SUMMARY

A compound energy absorption system for a steering column may include a first energy absorption mechanism and a second energy absorption mechanism that is different than the first energy absorption mechanism. The first energy absorption mechanism may include, for example, a slide and a deformation strip, or "dog bone." In some cases, the slide may be disposed on a tooth plate, opposite a side of the tooth plate that has teeth. In fact, the slide may be positioned on the tooth plate facing an inner jacket tube of the steering column. The deformation strip may be attached to the inner jacket tube, and a steering shaft that is connectable to a steering wheel may be rotatably mounted in the inner jacket tube. Nevertheless, the slide may straddle the deformation strip and deform the deformation strip during relative movement between the two in a crash event. In particular, in a crash event the inner jacket tube and the deformation strip move relative to the slide, and the slide "squeezes" the deformation strip to deform the deformation strip and thereby provide a resistive force to a steering wheel via the inner jacket tube and the steering shaft. To permit clearance for the slide to travel along the deformation strip, a majority of a length of the deformation strip may be elevated off the inner jacket tube, above ends at which the deformation strip is attached to the inner jacket tube.

The second energy absorption mechanism may include, for example, an energy absorbing strap such as a bend-tear sheet (BTS) or a wire that mates with a carrier. The carrier can be affixed to the inner jacket tube. The carrier may have catches that extend through slots of the energy absorbing strap and prevent outer segments of the energy absorbing strap from moving relative to the carrier during a crash event. The tooth plate, and specifically the teeth of the tooth plate, may be used in connection with a lock that enables the steering column to be selectively repositioned. In some examples, the first and second energy absorption mechanisms may be positioned in series along the inner jacket tube of the steering column. The second energy absorption mechanism may even be disposed in compact fashion between the inner jacket tube and an arm of the tooth plate.

Depending on the severity or anticipated severity of a crash event, a pin of a pyrotechnic switch may selectively couple or decouple a portion of a tongue that extends from a central portion of the energy absorbing strap to engage or disengage the second energy absorption mechanism. The central portion of the energy absorbing strap may be disposed between the outer segments of the energy absorbing strap, and the tongue may be bent such that the portion of the tongue that is couplable with the pyrotechnic switch opposes the central portion of the energy absorbing strap. The pyrotechnic switch may be coupled to the arm of the tooth plate, which may also oppose the energy absorbing strap. Hence the pyrotechnic switch may be configured to couple the tongue of the energy absorbing strap and the arm of the tooth plate. When the second energy absorption mechanism is engaged, in a crash event the inner jacket tube, the carrier, and the outer segments of the energy absorbing strap move relative to the portion of the tongue coupled to the pyrotechnic switch causing the central portion of the energy absorbing strap to bend and/or tear. The energy absorbing strap may include channels, which are aligned with the tongue and along which channels the energy absorbing strap is configured to tear in a crash event.

DETAILED DESCRIPTION

Although certain example methods and apparatuses are described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art.

Figure 1:
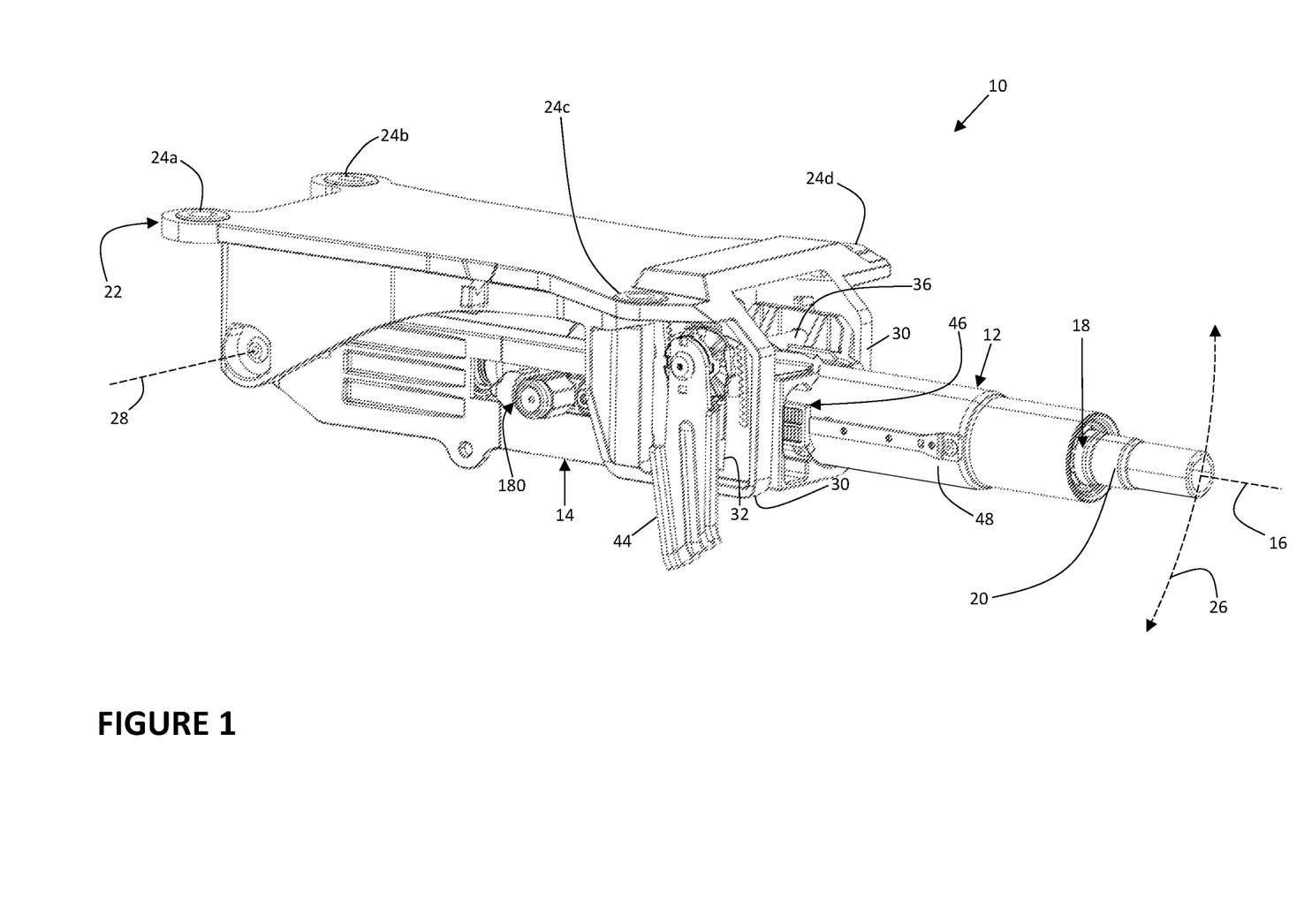
FIG. 1 is a perspective view of an example steering column.

FIG. 1 is a perspective view of an example steering column 10. The steering column 10 may include an inner jacket tube 12 that is mounted in an outer shell 14 so as to be displaceable along a longitudinal axis 16 relative to the outer shell 14. Those having ordinary skill in the art will understand that the various components identified herein may be known by other names as well. For instance, the outer shell 14 may also be known as an "outer column jacket." Nevertheless, a steering shaft 18 may be rotatably mounted in the inner jacket tube 12. A first end 20 of the steering shaft 18 protruding from the inner jacket tube 12 may be connectable to a steering wheel with which a driver can steer a vehicle, for instance. Because the inner jacket tube 12 can be displaced longitudinally relative to the outer shell 14, the driver can control a longitudinal position of the steering wheel relative to the inner jacket tube 12.

The example steering column 10 shown in FIG. 1 is a manually adjustable steering column. However, the present disclosure is not limited to manually adjustable steering columns. Those having ordinary skill in the art will readily understand that the present disclosure may be equally applicable to power steering columns, other vehicle structures, etc.

Further, the outer shell 14 may be attached to a chassis or a body of the vehicle by way of a holder 22 (or "bracket" or "mounting bracket") having mounting points 24a, 24b, 24c, 24d. As explained below, the outer shell 14 may be pivotally mounted relative to the holder 22. Consequently, the outer shell 14 and the inner jacket tube 12 can be selectively pivoted relative to the holder 22 such that the first end 20 of the steering shaft 18 can be moved and positioned along a path 26 to further suit the needs of the driver. For ease of discussion, the path 26 may be said to be vertical, at least within the context of FIG. 1 and the steering column 10.

In some examples, the outer shell 14 may be pivotably mounted to the holder 22 about a pivot axis 28. For reference, the example steering column 10 in FIG. 1 is positionable such that the pivot axis 28 is proximate a front of the vehicle, whereas the first end 20 of the steering shaft 18 is positionable distal the front of the vehicle. Notwithstanding, both the inner jacket tube 12 and the outer shell 14 may rotate together about the pivot axis 28. The holder 22 may further include clamping jaws 30 with slots 32.

Figure 2:
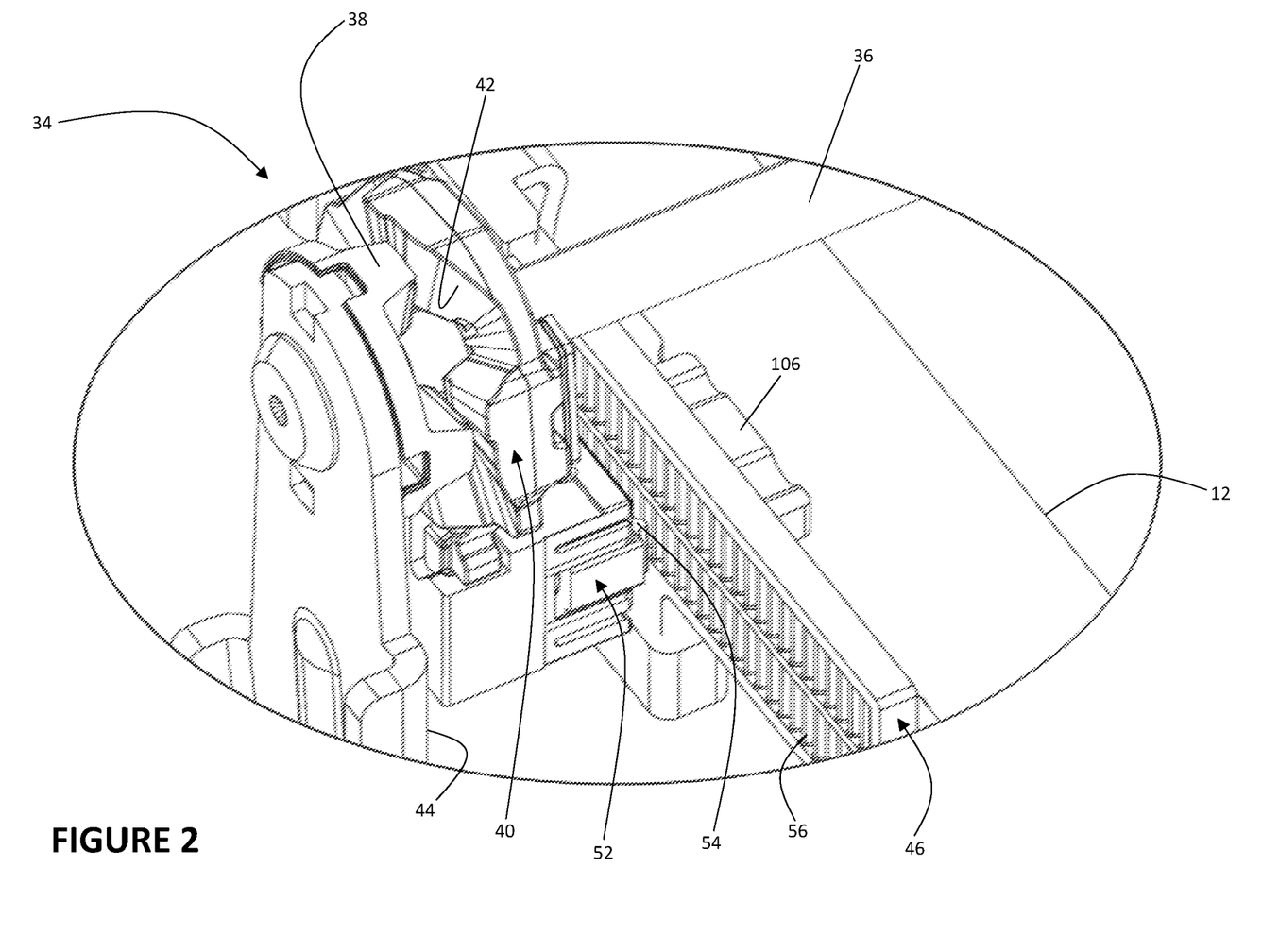
FIG. 2 is a perspective detail view of an example clutch of the steering column of FIG. 1, with multiple components of the steering column hidden to better show the clutch.

A clutch 34 (or "clamping device," "locking device," "fixing device") may enable the first end 20 of the steering shaft 18 to be selectively repositioned. The clutch 34 may cooperate with a clamping bolt 36 that passes through the slots 32 of the clamping jaws 30 and through one or more bores of the outer shell 14. As shown best in FIG. 2, the clutch 34 may include a first stroke disk 38, which can be configured as a cam disk, and a second lifting disk 40, which can be configured as a link disk. In some cases, the second lifting disk 40 may include a cam track 42. The first stroke disk 38 may be fixed to an actuating lever 44 and the clamping bolt 36. The actuating lever 44 may cooperate with the clamping bolt 36 and the disks 38, 40, amongst other parts, to selectively enable the first end 20 of the steering shaft 18 to be repositioned, as disclosed more fully in German Patent Publication No. DE102016220531A1 and counterpart U.S. patent application Ser. No. 16/340,428 filed Apr. 19, 2019 and entitled, "Steering Column Comprising an Adaptive Energy Absorption Device for a Motor Vehicle"; U.S. Pat. No. 9,845,105 filed Feb. 17, 2016 and entitled "Adjustment Mounting Bracket Assembly for Steering Column"; U.S. Pat. No. 9,845,104 filed Feb. 10, 2014 and entitled "Steering Column Tilting Device"; and/or European Patent No. EP2993108 filed Feb. 19, 2014 and entitled "Steering Device," all of which are hereby incorporated by reference in their entireties.

As shown in FIGS. 1-5, a tooth plate 46 may be disposed on an outer surface 48 of the inner jacket tube 12 at least in part via a fastener, for example, or other fastening means. The tooth plate 46 may be oriented parallel to the longitudinal axis 16 along which the steering shaft 18 and inner jacket tube 12 extend. The steering column 10 may further include a lock 52 that is operably connected to the second lifting disk 40 and can be pressed by the clutch 34 against the tooth plate 46. The lock 52 may comprise teeth 54 that can be pressed against the tooth plate 46. Indeed, in some examples a preload member (not shown) such as a spring may bias the teeth 54 of the lock 52 against the tooth plate 46.

The clutch 34 may be configured in a clamped state or a released state by way of the actuating lever 44. In the clamped state, where the steering shaft 18 is fixed, the inner jacket tube 12 is longitudinally fixed relative to the outer shell 14 and the holder 22 (i.e., preventing longitudinal adjustment), and the outer shell 14 is rotatably fixed relative to the holder 22 (i.e., preventing vertical adjustment of the first end 20 of the steering shaft 18). To fix the inner jacket tube 12 longitudinally relative to the outer shell 14 and the holder 22, the clutch 34 may hold the lock 52 against the tooth plate 46, and the teeth 54 of the lock 52 may be engaged with teeth 56 of the tooth plate 46 to fix the tooth plate 46 longitudinally relative to the holder 22. When the teeth 54 of the lock 52 engage the teeth 56 of the tooth plate 46, displacement of the tooth plate 46 (and hence the inner jacket tube 12 and the steering shaft 18) along the longitudinal axis 16 relative to the holder 22 is prevented. Similarly, when clamped, the clutch 34 may cause one of the disks 38, 40 or another component disposed along the clamping bolt 36 to be secured to at least one of the clamping jaws 30 so as to prevent the outer shell 14 from sliding up or down within the slots 32 of the clamping jaws 30.

Conversely, in a released state of the clutch 34, the inner jacket tube 12 can be displaced along the longitudinal axis 16 relative to the outer shell 14 and the holder 22. Likewise, in the released state of the clutch 34, the outer shell 14 can be pivoted about the pivot axis 28 relative to the holder 22 to move the first end 20 of the steering shaft 18 vertically along the path 26 shown in FIG. 1. To move the inner jacket tube 12 along the longitudinal axis 16 relative to the outer shell 14 and the holder 22 during normal operation of the vehicle (i.e., prior to a crash event), the clutch 34 must first be transferred from the clamped state to the released state via the actuating lever 44. Thus the lock 52 lifts away from the tooth plate 46 and displacement of the tooth plate 46 along the longitudinal axis 16 relative to the lock 52 is possible. It should further be understood that the lock 52 cannot be moved along the longitudinal axis 16 relative to the holder 22 and the outer shell 14 at least because the clamping bolt 36 is constrained longitudinally by the slots 32 of the clamping jaws 30. However, the clamping bolt 36 can be moved vertically within the slots 32. As a result, the inner jacket tube 12, the outer shell 14, the clutch 34, the clamping bolt 36, the actuating lever 44, and the lock 52 may pivot about the pivot axis 28 so as to move the first end 20 of the steering shaft 18 vertically along the path 26, all the while maintaining vertical alignment between the lock 52 and the tooth plate 46.

Figure 3:
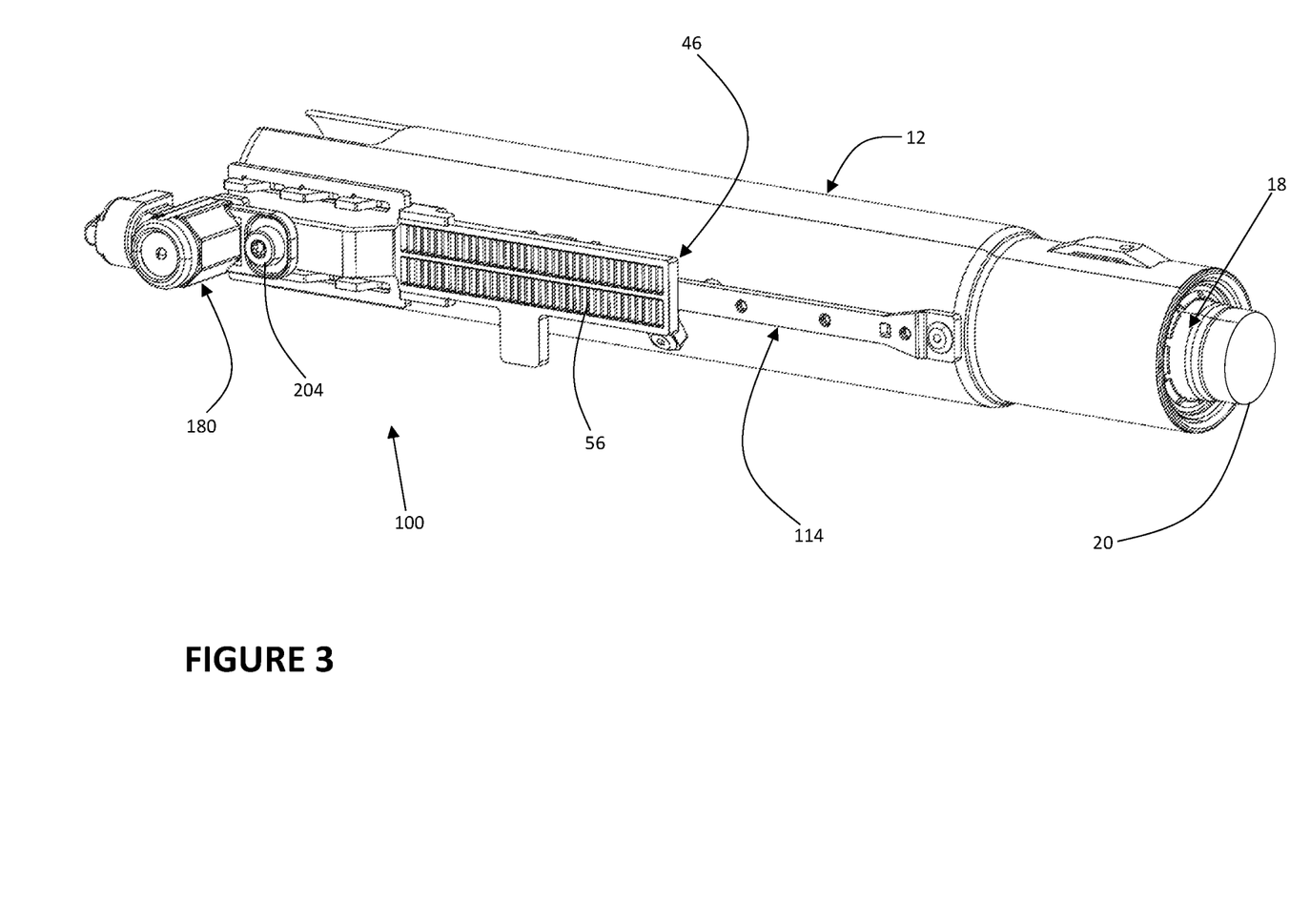
FIG. 3 is a perspective view of the example steering column of FIG. 1, with multiple components hidden to better show an example compound energy absorption system disposed on an inner jacket tube.
Figure 4:
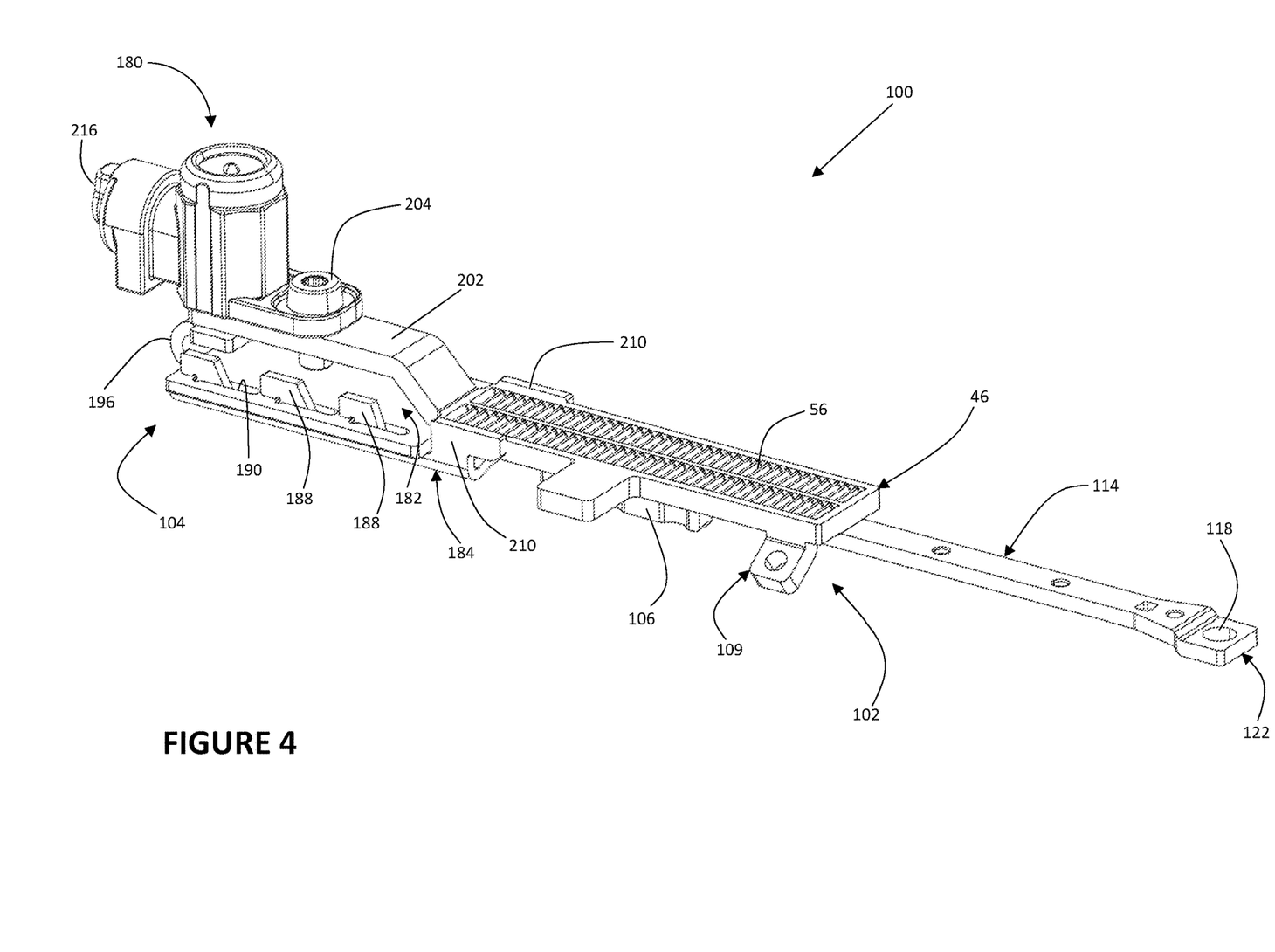
FIG. 4 is a perspective view of the example compound energy absorption system of FIG. 3.
Figure 5:
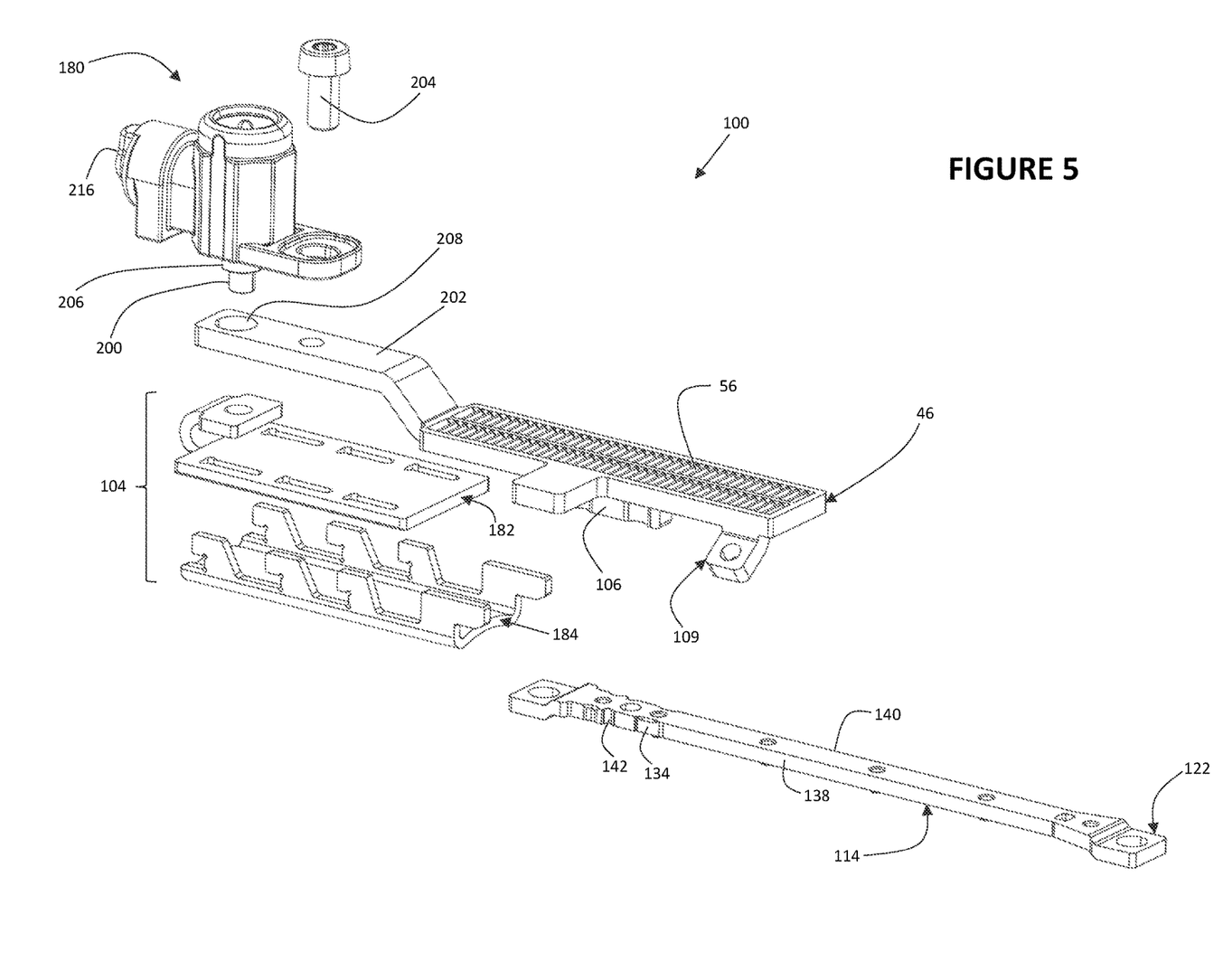
FIG. 5 is an exploded view of the example compound energy absorption system of FIGS. 3 and 4.

With reference now to FIG. 3, the example steering column 10 is shown without numerous components for reasons of clarity and ease of discussion. FIG. 3 generally shows a purely-exemplary compound energy absorption system 100 in the context of the steering shaft 18 and the inner jacket tube 12. FIG. 4 shows the example compound energy absorption system 100 in isolation, and FIG. 5 shows the example compound energy absorption system 100 in isolation in an exploded view. The compound energy absorption system 100 may comprise two different types of energy absorption mechanisms, which can be packaged in a particularly compact space. A first energy absorption mechanism 102 is shown best in FIG. 6, whereas a second energy absorption mechanism 104 is shown best in FIG. 7.

Figure 6:
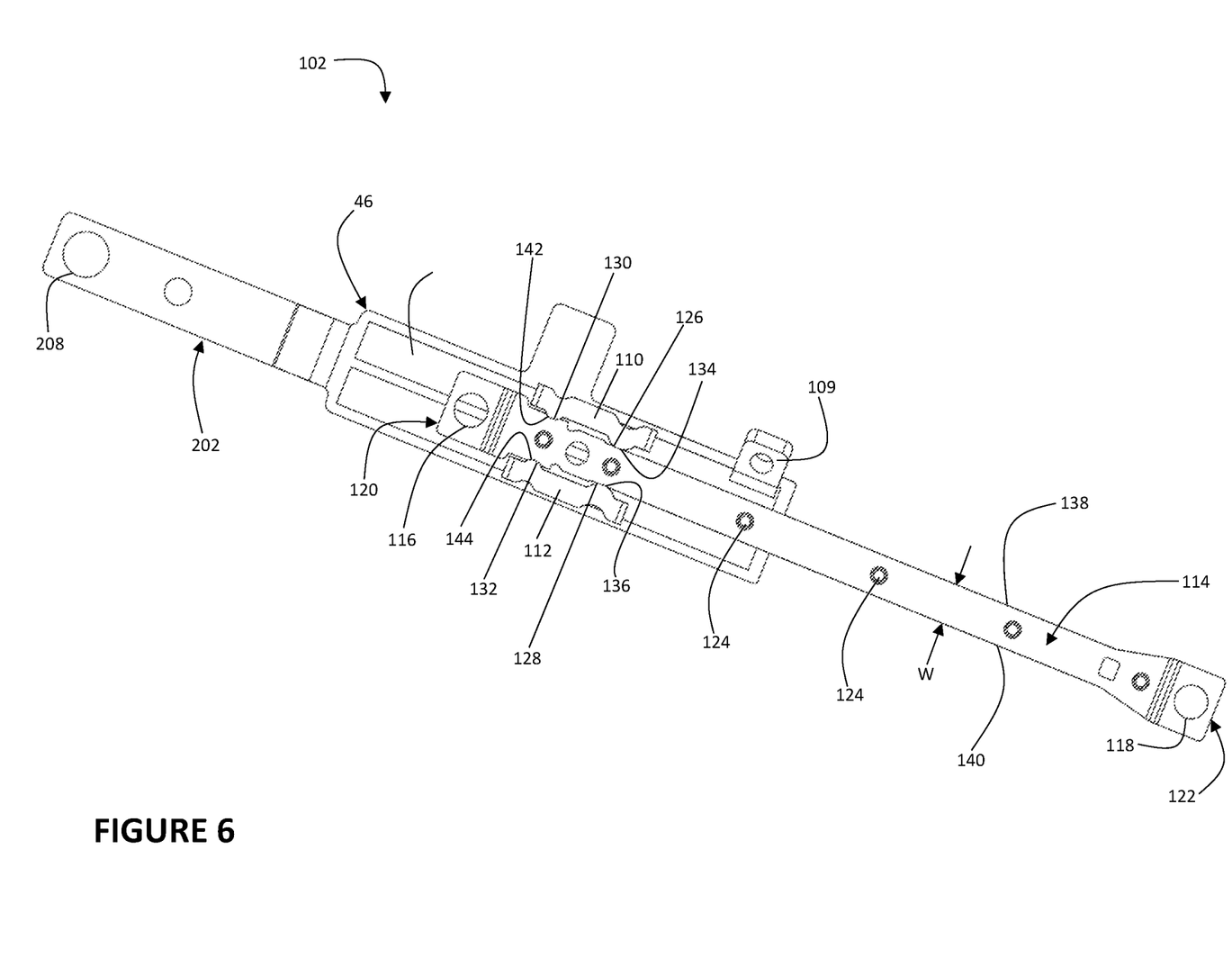
FIG. 6 is a bottom view of a tooth plate, a deformation slide, and a deformation strip of the example compound energy absorption system of FIGS. 3-5.

The first energy absorption mechanism 102 may include a slide 106 disposed on a side 108 of the tooth plate 46 that faces the inner jacket tube 12. One having ordinary skill in the art will understand that the slide 106 may be integral with or affixed to the tooth plate 46. The tooth plate 46 may include an attachment point 109 by which a shear element 58 such as a rivet, for example, secures the tooth plate 46 to the inner jacket tube 12 prior to a crash event. In a crash event, the shear element 58 may shear and release the attachment point 109 of the tooth plate 46 from the inner jacket tube 12. The slide 106 may comprise first and second portions 110, 112 that oppose one another and are configured to straddle a deformation strip 114, which may also be generally referred to as a "crash bone." In some respects, the first and second portions 110, 112 may be said to have an elongate structure. The deformation strip 114 may be secured to the inner jacket tube 12 via welds, rivets, or some other type of fasteners, in some cases via the apertures 116, 118 disposed at both ends 120, 122 of the deformation strip 114. In some examples, a majority of the deformation strip 114 may be elevated relative to the ends 120, 122 that attach to the inner jacket tube 12 so that the majority of the deformation strip 114 is spaced apart from the inner jacket tube 12. The deformation strip 114 may even include spacers 124 that space the majority of the deformation strip 114 apart from the inner jacket tube 12. Spacing the majority of the deformation strip 114 apart from the inner jacket tube 12 provides clearance for the slide 106 to travel along the deformation strip 114 in the event of a crash where energy needs to be absorbed, as will be explained. Alternatively, a segment of the deformation strip 114 that the slide 106 is intended to come in contact with during a crash event (though not necessarily a majority of the deformation strip 114) may be spaced apart from the inner jacket tube 12.

With further respect to the slide 106, at least one projection 126 may extend from either the first or second portions 110, 112. In the example shown in the figures, the slide 106 includes four projections 126, 128, 130, 132 that extend laterally inwards from the first and second portions 110, 112 towards one another and towards the deformation strip 114. The projections 126, 128, 130, 132 may have round faces. In some cases, the projections 126, 128 may be referred to as "lead" projections, and the other two projections 130, 132 may be referred to as "follower" projections. The lead projections 126, 128 may be protrude laterally inwards to a greater extent than the follower projections 130, 132. Moreover, prior to a crash event where the slide is maintained in a rest position, the lead projections 126, 128 may be disposed in recesses 134, 136 in sides 138, 140 of the deformation strip 114, and the follower projections 130, 132 may be disposed in recesses 142, 144 in the sides 138, 140 of the deformation strip 114.

In a crash event, the first energy absorption mechanism 102 may operate as follows. As the driver of the vehicle strikes the steering wheel, the steering shaft 18, the inner jacket tube 12, and the deformation strip 114 are pushed along or parallel to the longitudinal axis 16, towards a front bumper of a vehicle. Yet because the holder 22, the outer shell 14, the lock 52, and the tooth plate 46 are fixed with respect to the chassis or the body of the vehicle, the slide 106 also remains fixed in place. Consequently, the force on the steering wheel causes the deformation strip 114 to move relative to the slide 106, thereby causing the slide 106 to "travel" along a length of the deformation strip 114. More accurately, the deformation strip 114 moves through the slide 106 as the slide 106 remains stationary. Because at least the lead projections 126, 128—and in some cases the follower projections 130, 132—are narrower than a width W of the deformation strip 114, the slide 106 will "squeeze" the sides 138, 140 of the deformation strip 114 and cause the deformation strip 114 to deform when the projections 126, 128 leave the recesses 134, 136. Deformation of the deformation strip 114 in turn absorbs energy and softens the impact between the driver and the steering wheel by providing a resistive force to the steering wheel.

It should be understood that the width W of the deformation strip 114 may in some cases vary along the length of the deformation strip 114 for purposes of varying an amount of energy absorbed throughout a crash event. For example, if the width W of the deformation strip 114 is greater towards the end 122 than the end 120, the first energy absorption mechanism 102 will absorb more energy later in the course of the crash event as the slide 106 approaches the end 122 of the deformation strip 114 with the greater width.

In the example compound energy absorption system 100 shown in the figures, the first energy absorption mechanism 102 will be triggered in a crash event where the steering wheel is struck with sufficient force to cause the projections 126, 128 to leave the recesses 134, 136 and begin deforming the deformation strip 114. In other words, in this example, the first energy absorption mechanism 102 is always engaged and is not selectively engageable or selectively disengageable. However, those having ordinary skill will recognize the benefits of being able to selectively engage or selectively disengage the second energy absorption mechanism 104 to absorb an amount of energy proportional to the severity of the collision (or potential collision) between the driver and the steering wheel. In a low-impact collision between the driver and the steering wheel, an energy absorption system that absorbs too much energy will stop the driver's motion over an unnecessarily short distance as opposed to restraining the driver's motion over the maximum permissible distance. Put another way, such an energy absorption system would cause the driver to experience a higher-than-necessary deceleration rate. By contrast, in a high-impact collision between the driver and the steering wheel, an energy absorption system that provides too little energy absorption will not be able to sufficiently decelerate the driver.

Therefore, the compound energy absorption system 100 may vary the resistive force supplied in a crash event depending on pre-crash event conditions and/or conditions associated with the crash event, such as vehicle speed, mass of a driver, and/or whether the driver's seatbelt is fastened, for example. One way in which the compound energy absorption system 100 may do so is to selectively engage (or selectively disengage) the second energy absorption mechanism 104 depending on the severity (or potential severity) of the crash event. The severity of the crash event may be based on an energy level (or anticipated energy level) that a vehicle crash sensor system identifies at the time of the crash event. As will be explained below, a pyrotechnic switch 180, a solenoid, or the like may be utilized as means for selectively coupling (or selectively decoupling) the second energy absorption mechanism 104.

Figure 7:
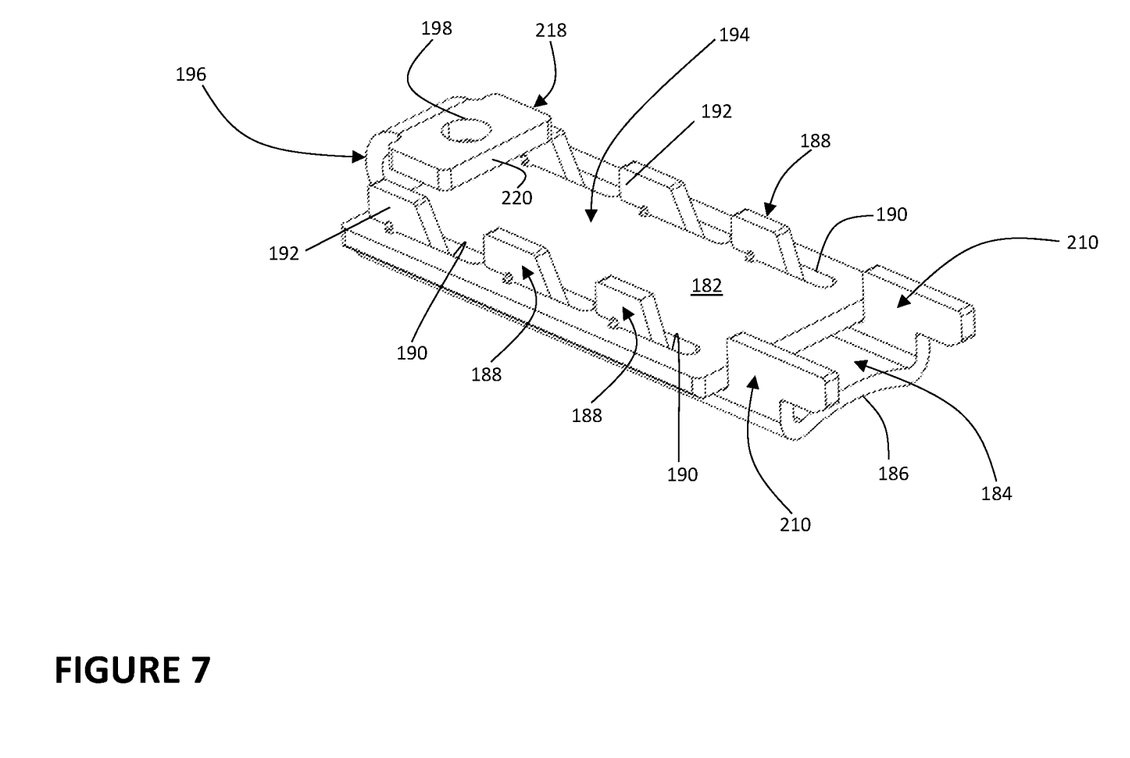
FIG. 7 is a perspective view of an energy absorbing strap and a carrier of the example compound energy absorption system of FIGS. 3-5.

As shown best in FIG. 7, the second energy absorption mechanism 104 may comprise an energy absorbing strap 182 such as a bend-tear sheet (BTS) or a wire, for instance, and a carrier 184. The carrier 184 may be connected to the inner jacket tube 12 via spot welds, laser welds, rivets, bolts, fasteners, or the like. To help maximize an amount of contact between the carrier 184 and the inner jacket tube 12, the carrier 184 may have a base 186 that conforms to the curvature of the inner jacket tube 12. Furthermore, the carrier 184 may include a series of catches 188 that extend upwards from the base 186. The energy absorbing strap 182 may have a plate-like design with a series of slots 190 that correspond to and are intended to receive the series of catches 188 of the carrier 184. In some cases, the catches 188 may be screws or rivets, for example. In other cases, the catches 188 may be replaced by welds between the energy absorbing strap 182 and the carrier 184. Nonetheless, in some examples, the catches 188 may not only be angled to oppose the relative movement of the energy absorbing strap 182 in a crash event, but may include tabs 192 that restrain and prevent certain segments of the energy absorbing strap 182 from lifting away from the carrier 184 in a crash event. The slots 190 may be disposed on both sides of a central portion 194 of the energy absorbing strap 182. The central portion 194 of the energy absorbing strap 182 may be configured to bend and/or tear during a crash event. Further, the catches 188 of the carrier 184 and the slots 190 of the energy absorbing strap 182 permit quick and easy replacement of the energy absorbing strap 182 after pre-production crash tests.

The energy absorbing strap 182 may further comprise a tongue 196 that extends from the central portion 194, that is bent 180° back above the central portion 194, and that includes an aperture 198. Depending on the severity of the crash (or potential crash), the pyrotechnic switch 180 may selectively couple (or selectively decouple) the second energy absorption mechanism 104 by way of a pin 200 that can extend into the aperture 198 of the tongue 196. In some examples (and going forward herein), a default position of the pin 200 may be such that the second energy absorption mechanism 104 is by default engaged. Thus, if the severity of the crash event does not require the second energy absorption mechanism 104, the pyrotechnic switch 180 may in a split-second disengage the second energy absorption mechanism 104 at or even before the beginning of a crash event by withdrawing the pin 200 from the aperture 198. To be clear, the pyrotechnic switch 180 may disengage the second energy absorption mechanism 104 before any crash event. For instance, if a vehicle is traveling at less than 20 MPH and a driver's seatbelt is fastened, the pyrotechnic switch 180 may disengage the second energy absorption mechanism 104. As can be seen in FIGS. 4 and 5, the pyrotechnic switch 180 is securely coupled to an arm 202 of the tooth plate 46 at least by way of a fastener 204. The pyrotechnic switch 180 may also be coupled to the arm 202 of the tooth plate 46 by way of a fitting 206 of the pyrotechnic switch 180 that extends into an aperture 208 in the arm 202. Because the pyrotechnic switch 180 is secured to the tooth plate 46, the pyrotechnic switch 180 also remains stationary during a crash event.

Thus, in a crash event, the second energy absorption mechanism 104 may operate as follows. As the driver of the vehicle strikes the steering wheel, the steering shaft 18, the inner jacket tube 12, and the carrier 184 are pushed along or parallel to the longitudinal axis 16, generally towards a front bumper of a vehicle. Yet because the holder 22, the outer shell 14, the lock 52, the tooth plate 46, and by extension the pyrotechnic switch 180 are fixed with respect to the chassis or body of the vehicle, the tongue 196 and the aperture 198 remain fixed in place when the pin 200 of the pyrotechnic switch 180 occupies the aperture 198. The central portion 194 of the energy absorbing strap 182 then begins to bend, tear, or bend and tear between the slots 190 as the catches 188 act on the energy absorbing strap 182.

The guides 210 of the carrier 184 may serve numerous purposes. For example, as shown best in FIG. 4, in a crash event the guides 210 guide movement of the carrier 184 and the inner jacket tube 12 relative to the stationary tooth plate 46. Maintaining alignment between the carrier 184 and the energy absorbing strap 182 during a crash event helps ensure that the second energy absorption mechanism 104 will absorb energy and provide a resistive force as intended. As another example, the guides 210 of the carrier 184 help reinforce the load that the carrier 184 transfers to the energy absorbing strap 182 in a crash event.

Figure 8:
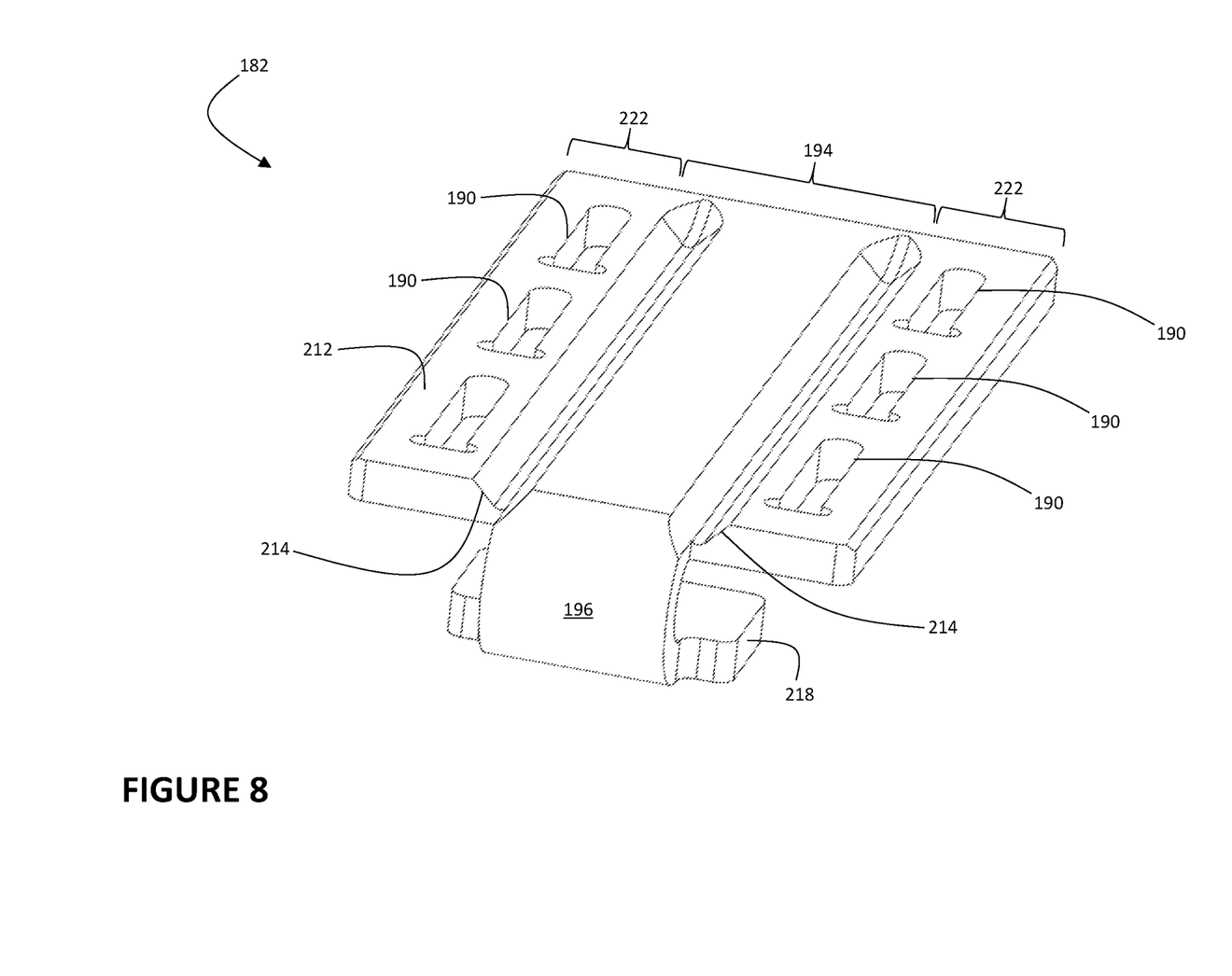
FIG. 8 is a perspective view showing an underside of the energy absorbing strap of the example compound energy absorption system of FIGS. 3-5.

As shown in FIG. 8, a side 212 of the energy absorbing strap 182 that faces the carrier 184 may include channels 214 that extend along the central portion 194 of the energy absorbing strap 182. The channels 214 help ensure that the central portion 194 of the energy absorbing strap 182 bends and/or tears as intended during a crash event. For example, the channels 214 may prevent the energy absorbing strap 182 from tearing along the series of slots 190 or transverse to the relative movement between the aperture 198 and the carrier 184, for instance. Still further, the spacing between the channels 214 and characteristics about the profile (or cross-section) of the channels 214, such as depth, width, length, and contour, for example, may be used to control the energy absorbed by the second energy absorption mechanism 104. In some instances, the profile of the channels 214 may vary along the length of the channels 214. By way of example, the channels 214 may become shallower (i.e., a depth of the channels 214 may decrease) with proximity to the guides 210 of the carrier 184 so that the energy absorbing strap 182 provides an increasing amount of resistive force throughout the course of the crash event.

Figure 9:
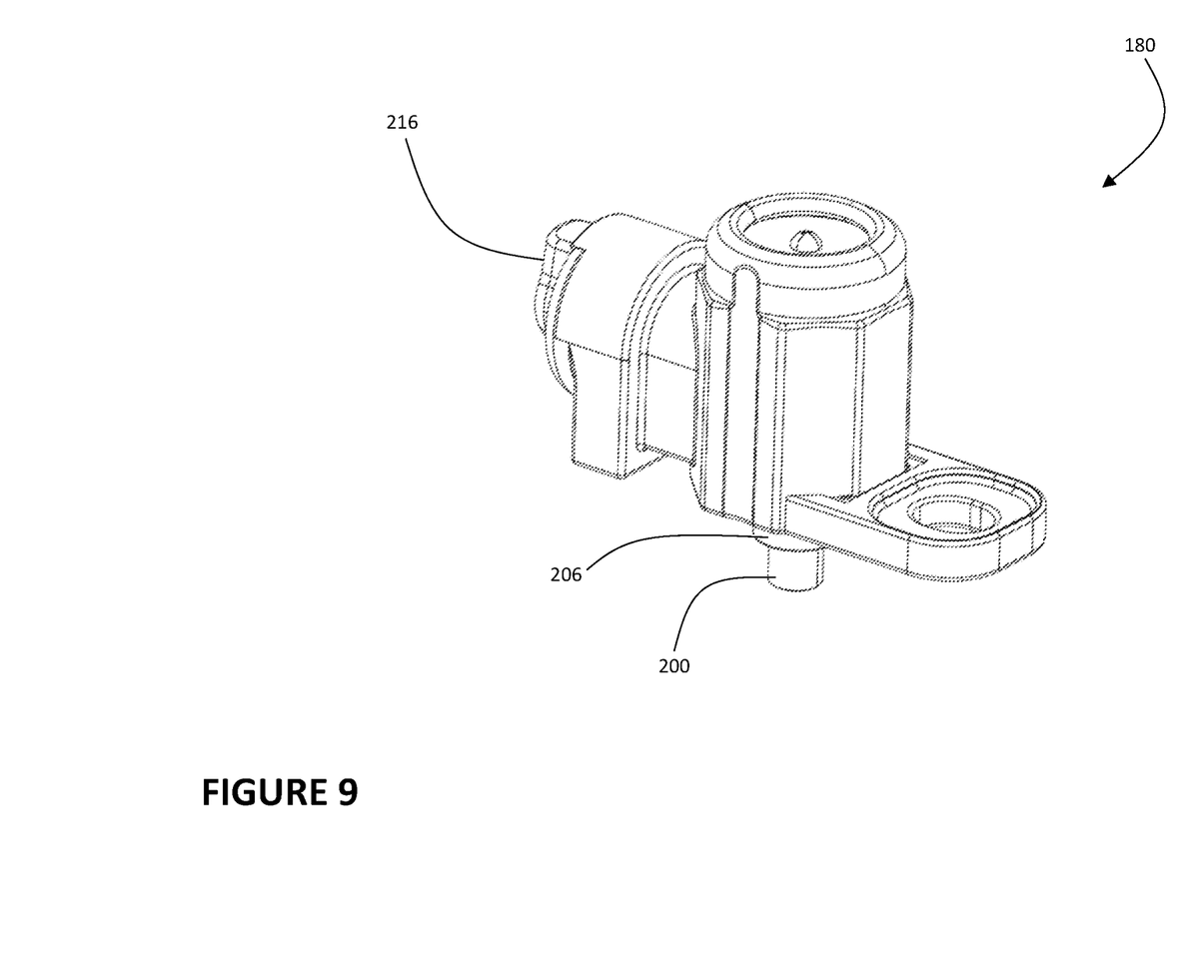
FIG. 9 is a perspective view of a pyrotechnical switch that selectively couples multiple energy absorption mechanisms of the example energy absorption system of FIGS. 3-5.

FIG. 9 provides another perspective view of the example pyrotechnic switch 180. A port 216 of the pyrotechnic switch 180 may be configured to receive one or more leads from sensors and/or a controller, for example. In some cases, the controller may simply send a command to the pyrotechnic switch 180 concerning whether to disengage the second energy absorption mechanism 104. In other cases, however, data may be input via the leads and the pyrotechnic switch 180 can make the decision as to whether to disengage the second energy absorption mechanism 104 based on programmable logic loaded onto the pyrotechnic switch 180.

Furthermore, the pin 200 of the pyrotechnic switch 180 may protrude far enough towards the energy absorbing strap 182 to prevent the pin 200 from disengaging from the aperture 198 and hence the tongue 196 of the energy absorbing strap 182 mid-crash. Such disengagement might theoretically occur if a portion 218 of the tongue 196 proximal the aperture 198 begins to bend downwards towards the central portion 194 of the energy absorbing strap 182 during the crash event. Thus, for example, the pin 200 may be configured to extend at least halfway between opposing surfaces of the portion 218 of the tongue 196 by the aperture 198 and the central portion 194 of the energy absorbing strap 182. Alternatively or additionally, the portion 218 of the tongue 196 by the aperture 198 may be positioned in some examples no more than twice, for example, as far from the central portion 194 of the energy absorbing strap 182 than a depth of the aperture 198 (or thickness of the portion 218). Still another way of preventing any inadvertent disengagement is to bend a distal end 220 of the tongue 196 towards the energy absorbing strap 182 so that the aperture 198 and the portion 218 of the tongue 196 by the aperture 198 are held up against the arm 202 in full engagement with the pin 200.

To reiterate, if the severity of a crash event is such that the second energy absorption mechanism 104 is not required, the pyrotechnic switch 180 may disengage the second energy absorption mechanism 104 at the beginning of the crash event. In this scenario, the first energy absorption mechanism 102 will provide the resistive force of the compound energy absorption system 100. Conversely, if the severity of the crash event is such that the second energy absorption mechanism 104 is required, the compound energy absorption system 100 may operate as follows. The impact between the driver and the steering wheel will cause the steering shaft 18, the inner jacket tube 12, the deformation strip 114, the carrier 184, and outer segments 222 of the energy absorbing strap 182 to move along or parallel to the longitudinal axis 16, which is generally towards a front bumper of the vehicle. On the other hand, at least the following components will remain stationary in a crash event because they are directly or indirectly coupled to the chassis or the body of the vehicle: the holder 22, the outer shell 14, the lock 52, the tooth plate 46, the pyrotechnic switch 180, and the portion 218 of the tongue 196 proximate the aperture 198 of the energy absorbing strap 182. Thus, with respect to the first energy absorption mechanism 102, the deformation strip 114 moves relative to the slide 106 as the projections 126, 128, 130, 132 of the slide 106 deform the deformation strip 114. With respect to the second energy absorption mechanism 104, the carrier 184 and the outer segments 222 of the energy absorbing strap 182 move relative to the pin 200 and the portion 218 of the tongue 196 by the aperture 198 as the central portion 194 of the energy absorbing strap 182 bends and/or tears.

One having ordinary skill in the art will understand that the present disclosure is not limited to combining energy absorbing straps and crash bones, but contemplates the combination of different types of energy absorption mechanisms, especially in ways that make energy absorption systems more compact. In many cases, these different types of energy absorption mechanisms may be combined by pyrotechnic switches. Furthermore, the present disclosure is not limited to embodiments wherein a crash bone is always engaged and an energy absorbing strap is selectively disengaged. Based on the present disclosure, for instance, one having ordinary skill will understand how to modify the example compound energy absorption system 100 such that the energy absorbing strap is always engaged and the crash bone is selectively disengaged.

What is claimed is:

1. A compound energy absorption system comprising:
    a first energy absorption mechanism;
    a second energy absorption mechanism that is different than the first energy absorption mechanism, the second energy absorption mechanism comprising
        an energy absorbing strap that is configured to at least one of bend or tear in a crash event, and
        a carrier having catches that extend through slots of the energy absorbing strap; and
    means for selectively coupling/decoupling the second energy absorption mechanism.

2. The compound energy absorption system of claim 1 wherein a tongue of the energy absorbing strap is selectively coupled or decoupled by a pin of the means for selectively coupling/decoupling the second energy absorption mechanism.

3. The compound energy absorption system of claim 1 wherein the energy absorbing strap comprises a central portion and a tongue, wherein the tongue extends from the central portion and is bent such that a portion of the tongue opposes the central portion, with the central portion of the energy absorbing strap being configured to at least one of bend or tear in a crash event.

4. The compound energy absorption system of claim 1 wherein the energy absorbing strap comprises channels along which the energy absorbing strap is configured to tear in a crash event.

5. The compound energy absorption system of claim 1 wherein the first energy absorption mechanism comprises a slide and a deformation strip, wherein the slide straddles the deformation strip.

6. The compound energy absorption system of claim 5 wherein the deformation strip has a length and extends between a first end and a second end, wherein a greatest extent of the deformation strip is the length of the deformation strip, wherein a majority of the length of the deformation strip is elevated relative to the first and second ends of the deformation strip.

7. The compound energy absorption system of claim 5 comprising a tooth plate with teeth on a first side, wherein the slide is disposed on a second side of the tooth plate opposite the first side.

8. The compound energy absorption system of claim 7 wherein the means for selectively coupling/decoupling the second energy absorption mechanism is configured to couple or decouple an arm of the tooth plate and a tongue of the energy absorbing strap of the second energy absorption mechanism.

9. A compound energy absorption system for a steering column, the compound energy absorption system comprising:
a first energy absorption mechanism that comprises a deformation strip and a slide that straddles the deformation strip, wherein the deformation strip is configured to move relative to the slide in a crash event;
a second energy absorption mechanism that comprises
an energy absorbing strap, wherein the energy absorbing strap is configured to at least one of bend or tear in a crash event, and
a carrier with which the energy absorbing strap mates; and
means for selectively coupling/decoupling the second energy absorption mechanism, wherein the deformation strip and the carrier are configured to move relative to the slide and the means for selectively coupling/decoupling in a crash event.

10. The compound energy absorption system of claim 9 wherein the carrier has catches that extend through slots of the energy absorbing strap and prevent outer segments of the energy absorbing strap from moving relative to the carrier in a crash event.

11. The compound energy absorption system of claim 10 wherein a central portion of the energy absorbing strap is disposed between the outer segments of the energy absorbing strap, wherein a tongue protrudes from the central portion of the energy absorbing strap and a portion of the tongue is configured to be coupled to or decoupled from the means for selectively coupling/decoupling, wherein in a crash event the portion of the tongue coupled to the means for selectively coupling/decoupling remains stationary relative to the carrier and the outer segments of the energy absorbing strap.

12. The compound energy absorption system of claim 9 wherein a portion of a tongue extending from the energy absorbing strap is configured to be coupled to or decoupled from the means for selectively coupling/decoupling, wherein a side of the energy absorbing strap comprises channels along which the energy absorbing strap is configured to tear in a crash event, wherein the channels are aligned with the tongue that extends from the energy absorbing strap.

13. The compound energy absorption system of claim 9 wherein the deformation strip, a tooth plate of the first energy absorption mechanism, the energy absorbing strap, and the carrier are aligned along or parallel to a longitudinal axis.

14. A compound energy absorption system for a steering column, the compound energy absorption system comprising:
a first energy absorption mechanism that comprises a deformation strip and a slide that straddles the deformation strip, wherein the deformation strip is configured to move relative to the slide in a crash event;
a second energy absorption mechanism that comprises an energy absorbing strap, wherein the energy absorbing strap is configured to at least one of bend or tear in a crash event, wherein the first and second energy absorption mechanisms are configured to be positioned in series along a tube of the steering column; and
means for selectively coupling/decoupling the second energy absorption mechanism.

15. The compound energy absorption system of claim 14 wherein the second energy absorption mechanism comprises a tooth plate with teeth on a first side, wherein the slide is disposed on a second side of the tooth plate opposite the first side, wherein an arm of the tooth plate opposes the energy absorbing strap and is couplable to a curved tongue of the energy absorbing strap by way of the means for selectively coupling/decoupling.

16. A steering column comprising:
an inner jacket tube;
a steering shaft rotatably mounted in the inner jacket tube; and
a compound energy absorption system disposed on the inner jacket tube, the compound energy absorption system including
a first energy absorption mechanism that comprises a deformation strip affixed to the inner jacket tube, the first energy absorption mechanism comprising a slide that straddles the deformation strip, wherein the inner jacket tube and the deformation strip are configured to move relative to the slide in a crash event,
a second energy absorption mechanism that comprises a carrier that mates with an energy absorbing strap, with the carrier being affixed to the inner jacket tube, and
means for selectively coupling/decoupling a portion of a tongue that extends from a central portion of the energy absorbing strap configured to at least one of bend or tear in a crash event.

17. The steering column of claim 16 wherein in a crash event the inner jacket tube, the carrier, and outer segments of the energy absorbing strap are configured to move relative to the portion of the tongue.

18. The steering column of claim 16 comprising a tooth plate, wherein the slide is disposed on a side of the tooth plate that faces the inner jacket tube, wherein the second energy absorption mechanism is disposed between the inner jacket tube and an arm of the tooth plate.

19. The steering column of claim 16 wherein the tongue is bent such that the portion of the tongue opposes the central portion, wherein catches of the carrier extend through slots of the energy absorbing strap.

20. The steering column of claim 16 wherein the energy absorbing strap comprises channels along which the energy absorbing strap is configured to tear in a crash event, the channels being aligned with the tongue.

21. The steering column of claim 16 wherein the second energy absorption mechanism is disposed between the inner jacket tube and the means for selectively coupling/decoupling.

* * * * *